US005139891A

United States Patent [19]

Cowie et al.

[11] Patent Number: 5,139,891

[45] Date of Patent: Aug. 18, 1992

[54] PALLADIUM ALLOYS HAVING UTILITY IN ELECTRICAL APPLICATIONS

[75] Inventors: John G. Cowie, Bethany; Jacob Crane, Woodbridge; Julius C. Fister, Hamden, all of Conn.

[73] Assignee: Olin Corporation, New Haven, Conn.

[21] Appl. No.: 724,241

[22] Filed: Jul. 1, 1991

[51] Int. Cl.$^5$ ........................ B32B 15/00; C22C 5/00; H01R 13/03

[52] U.S. Cl. .................................. 428/670; 428/674; 428/929; 428/931; 420/463; 420/464; 439/886

[58] Field of Search ............... 428/670, 674, 929, 931; 420/463, 464; 439/886, 887, 931

[56] References Cited

U.S. PATENT DOCUMENTS

| | | | |
|---|---|---|---|
| 2,787,688 | 2/1957 | Hall et al. | 200/166 |
| 2,890,114 | 6/1959 | Ruthardt et al. | 420/463 |
| 3,036,251 | 5/1962 | Brenner | 420/463 |
| 3,305,817 | 2/1967 | Doi | 420/463 |
| 3,438,770 | 4/1969 | Clark et al. | 75/134 |
| 3,561,956 | 2/1971 | Norreys | 420/463 |
| 3,597,194 | 8/1971 | Savage | 75/134 |
| 3,713,270 | 1/1973 | Farr et al. | 55/16 |
| 3,826,886 | 7/1974 | Hara et al. | 200/166 |
| 3,994,718 | 11/1976 | Berndt et al. | 75/84.1 |
| 3,995,516 | 12/1976 | Boily et al. | 83/5 |
| 4,063,937 | 12/1977 | Goltsov et al. | 75/172 |
| 4,432,794 | 2/1984 | Holleck | 75/239 |
| 4,719,081 | 1/1988 | Mizuhara | 420/463 |
| 4,728,580 | 3/1988 | Grasselli et al. | 428/610 |
| 4,995,923 | 2/1991 | Mizumoto et al. | 420/463 |
| 5,051,235 | 9/1991 | Guerlet et al. | 420/463 |

FOREIGN PATENT DOCUMENTS

| | | | |
|---|---|---|---|
| 1092212 | 11/1960 | Fed. Rep. of Germany | 420/463 |
| 390176 | 7/1973 | German Democratic Rep. | 420/463 |
| 48-29447 | 9/1973 | Japan | 420/463 |
| 54-53618 | 4/1979 | Japan | 420/463 |
| 54-61025 | 5/1979 | Japan | 420/463 |
| 59-13140 | 6/1984 | Japan | 420/463 |
| 289885 | 12/1970 | U.S.S.R. | 420/463 |

OTHER PUBLICATIONS

Lees, Philip W. et al., "Characterization of Composite Clad Electroplated Contact Materials" appearing in IICIT Symposium '90 (Toronto, Ontario, Oct. 1990) 23rd Annual Connector & Interconnection Technology Symposium at pp. 133–148.

American Society for Testing and Materials (ASTM) designation B 667-80 entitled "Standard Practices for Construction and Use of a Probe for Measuring Electrical Contact Resistance", Inacted 1980.

Dwight, A. E. entitled "Alloying Behavior of Columbium" appearing in Metallurgical Society Conferences, vol. 10, entitled Columbium Metallurgy edited by D. L. Douglass, presented at Bolton Landing, N.Y., Jun. 9–10, 1960 at pp. 383–406.

Teeter, Jr. Richard S. et al., entitled "High Durability Connector System" appearing in IICIT Symposium '90 (Toronto, Ontario, Oct. 8–11, 1990) appearing in 23rd Annual Connector & Interconnection Technology Symposium at pp. 109–131.

Metals Handbook, 10th Edition, vol. 2 (1990) at pp. 815–817 and 1146.

*Primary Examiner*—John Zimmerman

*Attorney, Agent, or Firm*—Gregory S. Rosenblatt; Paul Weinstein

[57] ABSTRACT

A palladium alloy of the form PdNbM where M is at least one element selected from the group consisting of silicon, iron, nickel, copper, cobalt, boron and aluminum is provided. The alloys exhibit oxidation resistance and electrical contact resistance and are particularly suited for electrical applications such as coatings for electrical contacts or connectors. In a preferred embodiment, the alloy contains from about 5 to about 10 atomic percent niobium.

25 Claims, 1 Drawing Sheet

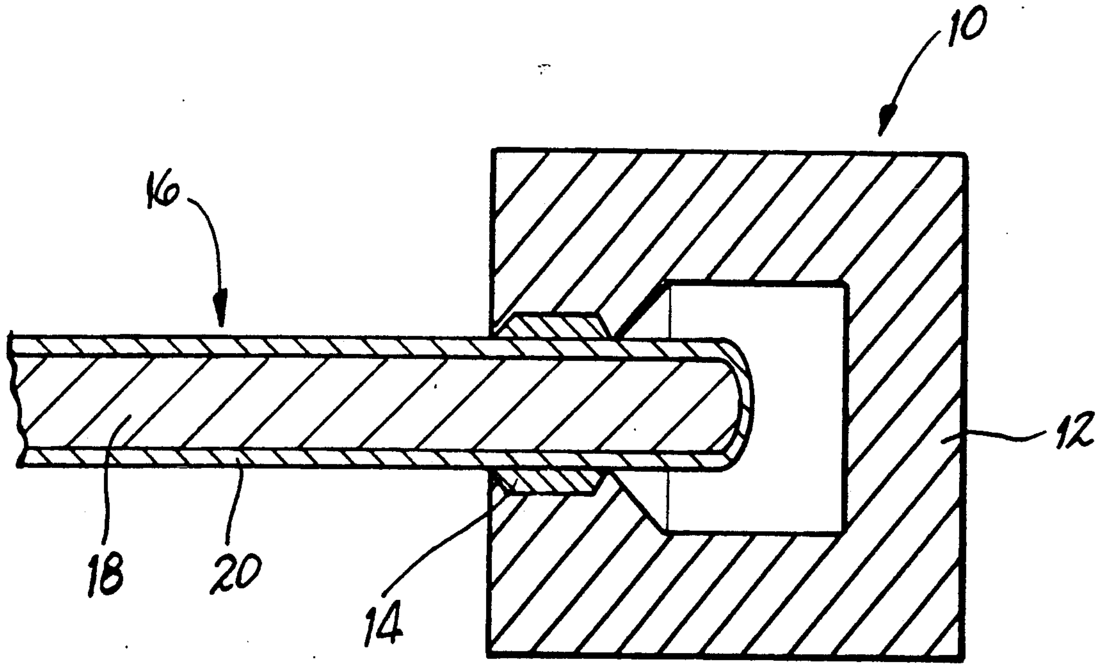
10
16
12
18
20
14

PALLADIUM ALLOYS HAVING UTILITY IN ELECTRICAL APPLICATIONS

FIELD OF THE INVENTION

The present invention relates to palladium alloys having electrical or electronic applications. More particularly, the palladium alloys contain a transition element selected from Group IVb, Vb or VIb and are useful as oxidation resistant, low electrical resistance coatings for connectors or contacts.

BACKGROUND OF THE INVENTION

Electrical interconnection systems require resistance to oxidation and corrosion as well as a low contact resistance. The system can be static or dynamic. One static system is a connector having a socket and an insertion plug to mechanically and electrically join electrical conductors to other conductors and to the terminals of apparatus and equipment. When located in a hostile environment, such as under the hood of an automobile, the connector is subject to vibration, elevated temperatures and a corrosive atmosphere. The connector must maintain low contact resistance following extended operation and multiple insertions.

One dynamic system is a contact to permit current flow between conductive parts, such as a relay switch for telecommunications. The contact must be capable of many thousands of on-off cycles without an increase in contact resistance.

Electrical interconnection systems are usually manufactured from copper or a copper alloy for high electrical conductivity. Copper readily oxidizes and a protective coating is required to prevent a gradual increase in contact resistance. Historically, gold has been the coating material of choice when the contact force is less than 100 grams. Tin has been employed when the contact force exceeds about 200 grams. Either tin or gold is used for contact forces in the intermediate range.

A hard gold coating is formed by adding a trace amount of cobalt to the gold. The "hard gold" is deposited on the surfaces of a copper or copper alloy connector to a thickness of from about 50 to 100 microinches. The gold coated connector is resistant to oxidation and corrosion and exhibits good wear characteristics. Gold is expensive and the price of gold is volatile, so alternatives have been sought. One alternative is palladium alloys.

Palladium is soft and prone to wear. In connector applications, palladium alloys which are harder than palladium metal are preferred. A connector alloy of palladium and zinc is disclosed in U.S. Pat. No. 2,787,688 to Hall et al. and a palladium/aluminum alloy is disclosed in U.S. Pat. No. 3,826,886 to Hara et al. Other palladium alloys for connector applications are disclosed in a paper by Lees et al. presented at the 23rd Annual Connector and Interconnection Technology Symposium and include Pd/25% by weight Ni and Pd/40% by weight Ag. Ternary alloys such as Pd/40% Ag/5% Ni are also utilized.

While exhibiting good wear characteristics and low initial contact resistance, Pd/Ni and Pd/Ag alloys increase in contact resistance following exposure to elevated temperatures due to the formation of nickel oxide and silver tarnish. A gold flash over the alloy is effective in reducing oxidation initiation sites which then creep along the alloy/flash interface.

It is therefore one object of the present invention to provide a palladium based alloy which has a low initial contact resistance and retains low contact resistance after extended exposure to high temperatures. It is a further object of the invention to provide electrical interconnection systems which are either formed from the palladium alloy or coated with it.

It is the feature of the invention that the palladium alloy contains at least one transition metal selected from Group IVb, Vb or VIb of the Periodic Table and is provided as a composite with copper, either by coating or inlay. It is an advantage of the present invention that the palladium alloys are harder than palladium, exhibit good oxidation resistance and have a low contact resistance, both initially and after extended exposure to elevated temperatures.

These and other objects, features and advantages of the present invention will become more obvious to one skilled in the art from the description and drawing which follow.

SUMMARY OF THE INVENTION

In accordance with the invention, there is provided a material for use in electrical or electronic applications. The material comprises a palladium alloy of the formula:

$$Pd_xM_yM'_z$$

where M is at least one element selected from the group consisting of silicon, iron, nickel, copper, chromium, cobalt, boron and aluminum; and M' is at least one element selected from the group consisting of titanium, vanadium, chromium, zirconium, niobium, molybdenum, hafnium, tantalum and tungsten. x is in the range of from about 0.75 to about 0.97. y is in the range of from 0 to about 0.05. z is in the range of from about 0.03 to about 0.25.

BRIEF DESCRIPTION OF THE DRAWING

The FIGURE shows in cross-sectional representation an electrical connector utilizing the alloys of the invention.

DETAILED DESCRIPTION OF THE PREFERRED EMBODIMENTS

The materials for use in electrical or electronic applications described herein are palladium alloys of the formula:

$$Pd_xM_yM'_z$$

where M' is at least one transition metal selected from group IVb, Vb or VIb of the Periodic Table of the Elements. That is, M' is selected from the group consisting of titanium, vanadium, chromium, zirconium, niobium, molybdenum, hafnium, tantalum, tungsten and mixtures thereof. Chromium oxidizes readily and is a less preferred selection. X,y and z represent the fractional atomic concentration of each component of the alloy so that x+y+z is approximately equal to 1. It is recognized that trace impurities which do not affect the basic properties of the palladium alloys may also be present.

Increasing the concentration of M' by increasing z, increases both the hardness and the oxidation resistance of the alloy. Increasing z also increases the contact resistance. For electrical interconnection applications, a Knoop hardness in excess of 100 KHN is desired. Further, the static contact resistance should be less than 20 milliohms. In the embodiment where a binary type alloy is provided (y=0) these requirements are satisfied for z in the range of from about 0.03 to about 0.25. More preferably, z is in the range of from about 0.03 to about 0.15. Correspondingly, the concentration of palladium is from about 75 to about 97 atomic percent (0.75–0.97) and in the more preferred embodiment, x is from about 0.85 to about 0.97.

By a binary type alloy, it is meant the alloy is of the formula $Pd_xM'_z$ where M' is a single element or combination of elements either in the form of a mixture or alloy.

Most preferably, the hardness of the alloy is in excess of 150 KHN and the static contact resistance is less than 10 milliohms both before and after exposure to elevated temperatures. For a binary type alloy, this is achieved when z is in the range of from about 0.05 to about 0.10.

In addition to binary type alloys, ternary and other alloys which provide increased strength from precipitation or solid solution hardening mechanisms are within the scope of the invention. The alloys can be fashioned while annealed and then aged prior to service or during high temperature operation to improve resistance to fretting and microwear. The ternary type alloys are formed by the inclusion of M and forming a solid state phase in combination with palladium. Suitable components for M include silicon, iron, nickel, copper, chromium, cobalt, boron and aluminum. The preferred elements for M are aluminum and silicon. M may be a combination of elements in the form of a mixture or an alloy.

For a ternary type alloy, the y value is that effective to provide additional strength. Increasing the concentration of M reduces the electrical conductivity, so a preferred range for y is below about 5 atomic percent. More preferably, y is in the range of from about an effective amount up to about 2 atomic percent and most preferably, y is from about 0.5 to about 1.5. The term "any effective" concentration refers to that minimal amount of M which has the effect of increasing the hardness of the palladium alloy.

While M' may be any group IVb, Vb or VIb transition element, as shown in the Examples which follow, alloys of palladium and niobium provide increased hardness and lower electrical contact resistance than would be expected from the group of transition elements. A most preferred material for use in electrical applications is a palladium/niobium alloy. Palladium/niobium alloys having a niobium concentration greater than about 6.8 atomic percent have a hardness of greater than 180 KHN. When the niobium concentration is less than about 10.2 atomic percent, the contact resistance is less than 10 milliohms. Even after aging the palladium/niobium alloys at 150° C. for 500 hours, there is no measurable increase in contact resistance. Unlike additions of nickel, niobium strengthens the palladium aiding in the resistance of macrowear in thin connector coatings without adversely affecting the connector's performance at elevated temperatures.

Electrical connectors or contacts may be formed from the palladium alloys of the invention. To minimize cost and to maximize electrical conductivity, in a preferred structure the palladium alloy covers at least a portion of the surface of a alloy substrate. The composite material has the alloy at least at the points of contact with another electrical component. The palladium alloy is supported by the substrate which is preferably copper or copper alloy. The palladium alloy may be supplied as either a coating or inlay.

For an inlay, an alloy of the desired composition is cast by any suitable means, such as melting in an arc melting furnace. One suitable arc melting furnace comprises an AC/DC inert gas welder such as Model 340 A/BP manufactured by Miller Electric of Appleton, WI (and disclosed in U.S. Pat. No. 2,880,374) in conjunction with a vacuum chamber. The furnace should be capable of achieving a temperature in excess of the liquidus point of the desired alloy. For the binary type alloys of the invention, a temperature of about 2000° C. is generally satisfactory. Other suitable means of forming the alloy include induction melting.

The desired concentration of palladium, M' and M, are placed in a water cooled copper mold. The furnace chamber is evacuated to a pressure of about 10 microns to minimize internal oxidation and other atmospheric contamination and then back filled with a mixture of helium and argon. The alloy components are heated to a temperature above the liquidus of the alloy, but below the vaporization temperature. The cast binary type alloys, PdM' forms a solid solution when cooled and any cooling rate is acceptable.

The ternary type alloys form a second phase when cooled at a sufficiently slow rate. It is preferred that the second phase not precipitate until the alloy has been formed into a connector so the cast alloy is rapidly solidified such as by cooling at a rate of about $1\times10^{6}$° C. per second to maintain the second phase in solid solution.

Once cast the alloy is extruded or rolled to a ribbon of a desired thickness and slit to a desired width. The alloy ribbon is then clad, forming an inlay in a copper or copper alloy substrate. While copper or any copper alloy is suitable as a substrate, high strength and high electrical conductivity alloys such as beryllium copper, copper alloys C7025 (nominal composition by weight 96.2% Cu, 3.0% Ni, 0.65% Si and 0.15% Mg), C688 (nominal composition by weight 73.5% Cu, 22.7% Zn, 3.4% Al, 0.4% Co) and C194 (nominal composition by weight 97.5% Cu, 2.35% Fe, 0.03% P and 0.12% Zn) are preferred.

An inlay is formed by any suitable means. The palladium alloy may be clad to a surface of the copper or copper alloy substrate. Alternatively, a channel is formed in the substrate such as by milling or skiving. An alloy ribbon is pressed into the channel and then pressure bonded such as by rolling to form the composite. This method of forming an inlay is disclosed in U.S. Pat. No. 3,995,516 to Boily et al. and incorporated herein by reference. The composite is then shaped into a connector component.

After forming the connector to a desired shape, heating the alloy to a temperature in the range of from about 300° C. to about 1200° C. will precipitate a second phase, age hardening the palladium alloy. The maximum temperature for heat treating should remain below the melting temperature of the substrate, or below about 1080° C. for copper and copper alloy substrates. Precipitation hardening is both time and temperature dependent, the higher the aging temperature, the shorter the time required to reach maximum hardness. The required minimum temperature is sufficiently low that precipitation may result during operation of the connector at an elevated temperature environment as low as about 150° C.

With reference to the Drawing, the FIGURE illustrates a connector as one exemplary interconnect system. A socket 10 is fashioned from a copper alloy substrate 12 having a palladium alloy inlay 14 at the point of contact with an insertion plug 16. The insertion plug 16 is a composite of copper or a copper alloy substrate 18 and a palladium alloy coating 20. The coating 20 may be applied as an inlay or over all surfaces of the substrate 18. Chemical vapor deposition as well as other suitable deposition processes may be used to apply the coating.

When in the form of an inlay 14, the palladium alloy generally has a thickness of from about 2 to about 10 microns. When deposited as a coating 18, the thickness is generally from about 1 to about 5 microns.

The utility of the palladium alloys of the invention will become more apparent from the Examples which follow. To determine the effect of M′ on hardness and electrical conductivity in a binary type palladium alloy, the alloys listed in Table 1 were cast by arc melting.

Weight percents may be readily converted to atomic percent as well as atomic percents converted to weight percent by use of the mole ratio. For example, 1000 grams of an 18 wt. % Nb/ 82 wt. % Pd alloy contains:

$1000\times0.18=180$ grams Nb $1000\times0.82=820$ grams Pd

Dividing by the atomic weight yields:

$180/92.906=1.937$ moles Nb $820/106.4=7.707$ moles Pd

The total number of moles is:

$1.937+7.707=9.644$

The atomic percent of each component is equal to the mole ratio for the element.

$1.937/9.644=20.1$ atomic percent Nb $7.707/9.644=79.9$ atomic percent Pd

TABLE 1

| Weight percent | Atomic percent |
|---|---|
| Palladium/3% Ta | Pd/1.8% Ta |
| Pd/10% Ti | Pd/19.8% Ti |
| Pd/15% Zr | Pd/17.1% Zr |
| Pd/18% Nb | Pd/20.1% Nb |
| Pd/20% Hf | Pd/13.0% Hf |
| Pd/21% W | Pd/13.3% W |
| Pd/26.6% Mo | Pd/28.0% Mo |

The static contact resistance of each alloy was measured in accordance with ASTM Standard B667 using a gold probe under dry circuit conditions. The static contact resistance was measured for the as cast alloy and the alloy after exposure to 150° C. in air for 150 hours, 500 hours and 1000 hours. The hardness of each as cast was also measured. Palladium metal was used as a control.

As shown in Table II, M′ concentrations above about 3 atomic percent produce a hardness in excess of about 150 KHN. When the concentration of M′ is below about 20 atomic percent, the contact resistance, both initial and after elevated temperature exposure, is below about 20 milliohms.

TABLE II

| | Contact Resistance (in milliohms) | | | | |
|---|---|---|---|---|---|
| Alloy | 0 hours | 150 hours | 500 hours | 1000 hours | Hardness |
| Palladium | 3.86 | 3 | 3.1 | 4.0 | 93.8 |
| Pa/1.8% Ta | 1.62 | 1.41 | 2.0 | 2.0 | 99 |
| Pd/13.0% Hf | 5.89 | 6.94 | 6.1 | 6.6 | 272.3 |
| Pd/13.3% W | 7.14 | 7.5 | 7.0 | 9.0 | 238 |
| Pd/17.1% Zr | 14.2 | 17.6 | 16.7 | 14.5 | 417.4 |

TABLE II-continued

| | Contact Resistance (in milliohms) | | | | |
|---|---|---|---|---|---|
| Alloy | 0 hours | 150 hours | 500 hours | 1000 hours | Hardness |
| Pd/20.1% Nb | 9.91 | 10.1 | 31.5 | 10.7 | 565.7 |
| Pd/19.8% Ti | 55.7 | 62.7 | 21.1 | 18.9 | 458.7 |
| Pd/28.0% Mo | 56.1 | 10.0 | 8.2 | 10.7 | 283.7 |

In addition to proving the suitability of alloys with a range of M′ of from about 3 to about 20 atomic percent, Table II shows niobium as the M′ component provides lower electrical resistance and higher hardness than expected from the other transition elements. For this reason, niobium is the most preferred alloying addition. The effect of niobium additions to the palladium alloy is more clear from Table III.

TABLE III

| Alloy (Atomic percent) | Contact Resistance 0 hours (milliohms) | Contact Resistance 500 hours at 150° C. (milliohms) | Hardness KHN |
|---|---|---|---|
| Pd/3.4% Nb | 1.9 | 2.0 | 100 |
| Pd/6.8% Nb | 3.0 | 3.3 | 160 |
| Pd/10.2% Nb | 5.5 | 6.5 | 220 |
| Pd/13.5% Nb | 10.5 | 10.3 | 250 |
| Pd/16.8% Nb | 10.7 | 10.5 | 270 |
| Pd/20.1% Nb | — | — | 570 |

While the invention has been described in terms of an electrical interconnection system and more specifically in terms of electrical connectors, it is recognized that the alloys are suitable for other electrical interconnection systems, other electrical applications requiring low electrical resistance, good oxidation resistance and/or high hardness as well as other non-electrical applications.

The patents and publications cited herein are intended to be incorporated by reference in their entireties.

It is apparent that there has been provided in accordance with this invention, palladium alloys suitable for electrical applications having oxidation resistance and low electrical contact resistance which fully satisfy the objects, means and advantages set forth hereinbefore. While the invention has been described in combination with specific embodiments and examples thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

We claim:

1. A palladium alloy for use in electrical or electronic applications consisting essentially of:

from about 75 to about 97 atomic percent palladium;

from about 3 to about 25 atomic percent niobium; and from that amount effective to provide increased hardness to about 5 atomic percent of at least one elemental addition selected from the group consisting of silicon, iron, nickel, copper, cobalt, boron and aluminum, wherein said palladium alloy has a contact resistance of less than about 20 milliohms.

2. The alloy of claim 1 wherein the amount of niobium is from about 3 to about 15 atomic percent.

3. The alloy of claim 2 wherein the amount of niobium is from about 5 to about 10 atomic percent.

4. The alloy of claim 3 wherein the amount of said elemental addition is in the range of from that amount effective to provide increased hardness up to about 2 atomic percent.

5. The alloy of claim 4 wherein the amount of said elemental addition is from about 0.5 to about 1.5 atomic percent.

6. An electrical connector formed from a palladium alloy consisting essentially of:

from about 75 to about 97 atomic percent palladium;
from about 3 to about 25 atomic niobium; and
from that amount effective to increase hardness to about 5 atomic percent of at least one elemental addition selected from the group consisting of silicon, iron, nickel, copper, cobalt, boron and aluminum, and said palladium alloy has a contact resistance of less than about 20 milliohms.

7. The electrical connector of claim 6 wherein the amount of niobium is from about 3 to about 15 atomic percent.

8. The electrical connector of claim 7 wherein the amount of niobium is from about 5 to about 10 atomic percent.

9. The electrical connector of claim 8 wherein said elemental addition is present in an amount of from that effective to provide increased hardness up to about 2 atomic percent.

10. A composite material, comprising:

a substrate with at least a portion of the surface covered by a palladium alloy consisting essentially of:
from about 75 to about 97 atomic percent palladium;
from about 3 to about 25 atomic percent niobium; and
from that amount effective to increase hardness to about 5 atomic percent of at least one elemental addition selected from the group consisting of silicon, iron, nickel, copper, cobalt, boron and aluminum, and said palladium alloy has a contact resistance of less than about 20 milliohms.

11. The composite material of claim 10 wherein said substrate is copper or a copper alloy and the amount of niobium is from about 3 to about 15 atomic percent.

12. The composite material of claim 11 wherein the amount of niobium is from about 5 to about 10 atomic percent.

13. The composite material of claim 12 wherein said elemental addition is present in an amount of from that effective to provide increased hardness up to about 2 atomic percent.

14. The composite material of claim 13 wherein said substrate is selected from the group consisting of beryllium copper, copper alloy C7025, copper alloy C688 and copper alloy C194.

15. The composite material of claim 13 wherein said palladium niobium alloy is provided as an inlay embedded in said copper or copper alloy substrate.

16. The composite material of claim 15 shaped into an electrical connector component.

17. The composite material of claim 16 wherein said substrate is selected from the group consisting of beryllium copper, copper alloy C7025, copper alloy C688 and copper alloy C194.

18. The composite material of claim 13 wherein said palladium niobium alloy is a coating on said copper or copper alloy substrate.

19. The composite material of claim 18 wherein said substrate is selected from the group consisting of beryllium copper, copper alloy C7025, copper alloy C688 and copper alloy C194.

20. An alloy consisting essentially of:

from about 85 to about 97 atomic percent palladium;
from about 3 to about 15 atomic percent niobium; and
from that amount effective to increase hardness to about 5 atomic percent of at least one elemental addition selected from the group consisting of silicon, iron, nickel, copper, cobalt, boron and aluminum, and said alloy has a contact resistance of less than about 20 milliohms.

21. The alloy of claim 20 wherein the amount of niobium present is from about 5 to about 10 atomic percent.

22. The alloy of claim 21 wherein said elemental addition is present in an amount of from that effective to provide increased hardness up to about 2 atomic percent.

23. The alloy of claim 22 wherein said elemental addition is present in an amount of from about 0.5 to about 1.5 atomic percent.

24. The alloy of claim 23 wherein said elemental addition is selected from the group consisting of aluminum and silicon.

25. The alloy of claim 20 wherein said elemental addition is selected from the group consisting of aluminum and silicon.

* * * * *